(12) United States Patent
Brew et al.

(10) Patent No.: US 6,413,072 B1
(45) Date of Patent: Jul. 2, 2002

(54) EXTRUSION DIE AND METHODS OF FORMING

(75) Inventors: Thomas W. Brew; Harry A. Kragle, both of Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/466,292

(22) Filed: Dec. 17, 1999

(51) Int. Cl.[7] .............................................. B29C 47/36
(52) U.S. Cl. .................. 425/198; 425/463; 425/382 R; 425/382.4
(58) Field of Search ................................ 425/198, 463, 425/462, 464, 382 R, 382.4; 264/177.12, 209.1, 630

(56) References Cited

U.S. PATENT DOCUMENTS

| 3,790,654 A | 2/1974 | Bagley et al. |
| 3,846,197 A | 11/1974 | Wiley |
| 3,905,743 A | 9/1975 | Bagley |
| 4,242,075 A | 12/1980 | Higuchi et al. |
| 4,298,564 A | * 11/1981 | Higuchi et al. ......... 264/177 R |
| 4,915,612 A | * 4/1990 | Gangeme et al. ........... 425/464 |
| 5,066,215 A | 11/1991 | Peters et al. |
| 5,702,659 A | 12/1997 | Kragle et al. |
| 5,811,048 A | * 9/1998 | Dunn et al. ............ 264/177.11 |

* cited by examiner

Primary Examiner—Mark Eashoo
(74) Attorney, Agent, or Firm—Kees van der Sterre

(57) ABSTRACT

Improved batch uniformity delivered to the discharge slots of an extrusion die is obtained by providing a stressor component of reduced cross-sectional area from the feedholes which suddenly increases the linear flow velocity due to its reduced cross-sectional area, and then just as suddenly restores the original flow conditions as it exits the stressor component into a larger diameter channel. A rapid change in particle alignment, due to the cross-sectional flow change, produces a shearing influence on the batch, and functions to produce a more uniform flow as it enters the discharge slot sections of the extrusion die.

8 Claims, 2 Drawing Sheets

EXTRUSION DIE AND METHODS OF FORMING

BACKGROUND OF THE INVENTION

The present invention relates to improved dies for the extrusion of honeycomb structures from plasticized organic or inorganic batch materials. More particularly, the invention relates to a honeycomb extrusion die incorporating a batch stressor which provides improved batch homogeneity, and methods for making and using the die. A batch stressor as defined herein, is a section of a significantly reduced flow channel located virtually immediately upstream of the slot matrix of a die.

The use of extrusion dies to form thin-walled honeycomb structures is well known in the art. U.S. Pat. Nos. 3,790,654 and 3,905,743 to Bagley describe one design for such a die, that design incorporating a plurality of feedholes entering an inlet face of the die and extending through the body of the die to convey extrudable material to a discharge section formed in the die outlet surface by an array of discharge slots. The discharge slots, formed between a plurality of pins interconnect with each other, reforming the extrudable material into an interconnected wall structure for a channeled honeycomb body as the material is discharged from the outlet face of the die.

As the uses for such honeycomb structures have increased, so also has the need for extrusion dies capable of forming more finely structured honeycombs. Die development has also focused on ways of obtaining a more uniform flow and proper distribution of extrudable material to the outlet face of the die. For example, published Japanese Utility Model applications 52-8761 and 52-8762 disclose discrete channels for the distribution of feed streams directly to slot locations on the outlet face, while U.S. Pat. No. 4,242,075 describes a die construction with feed material distribution channels feeding an array of spoke-supported cell blocks for forming the cells in the extruded honeycomb.

The problem of smoothly conveying a batch material from a feedhole inlet to a discharge slot outlet can be better appreciated when it is recognized that batch flow is longitudinal through the feedhole section of the die, but rapidly transitions to a combination of lateral and longitudinal flow at the feedhole/discharge slot interface. Rapid lateral flow at these junctions is required to adequately fill the discharge slot array, but if the flow is non-uniform, defects such as marginal cell wall knitting, wavy or swollen cell walls, missing cell walls, and plugged cell walls will appear in the extruded product.

Feedhole characteristics, such as diameter, surface finish, spiraling, etc., differ from one hole to another within a given die, and thus have a noticeable affect on the quality of the extruded substrate. Thin wall products tend to be especially sensitive to these non-uniform feedhole conditions. In addition, super smooth slot finishes generated by diamond wheel grinding are routinely available today, and the improved pin surfaces forming the slots further sensitize the die to the influences of non-uniform feedholes.

Non-uniform flow into the discharge slots and along the pin surface of the die is responsible for web defects in the extruded substrate. Gross defects show up as thick or swollen webs, while more subtle forms emerge as shadows. In electrical chemical machining (ECM) drilled body plates, these imperfections appear as banding along entire rows of feedholes, reflecting the positioning and advancing of the ECM tube holders as they are indexed across the blank during the drilling operations. In gun-drilled body plates, the flaws are organized into patchy areas which appear to track subtle differences in tooling quality and tooling changes. Extrusion dies for producing thin web honeycomb products are especially sensitive to flow conditions which exacerbate the degree and frequency of the defects caused by non-uniform batch flow.

The art has long recognized the desirability of smoothing the feed channels in an extrusion die to reduce back pressure and to reduce abrasive wear on the die caused by the inorganic powder mixtures being extruded. U.S. Pat. No. 5,066,215 describes a die wherein the feedholes uniformly taper to discharge slots on the die outlet surface. U.S. Pat. No. 3,846,197 also discloses a similar gradual transitioning of feedholes and discharge slots. In U.S. Pat. No. 5,702,659 the problem of material flow control at the feedhole-slot interface of a honeycomb extrusion die is addressed by fashioning the interface with a stack of thin plates. Each plate in the stack contains multiple openings representing a very thin cross-section of the desired flow channel within the die at that point. Such approach permits each successive plate in the stack to have its own unique geometry, and the stack transitions the flow of batch material from the feedholes to the discharge slots.

In the light of these continuing difficulties, it is a principal object of the present invention to provide an extrusion die that more effectively addresses many of the problems presented by conventionally constructed extrusion dies.

It is a further object of the invention to provide an extrusion method utilizing an improved die which uniformizes the batch material entering the discharge slots to provide extruded honeycombs of improved quality.

Other objects and advantages of the invention will become apparent from the following description thereof.

SUMMARY OF THE INVENTION

In accordance with the present invention, the problem of non-uniform material flow to the discharge slots of a honeycomb extrusion die is addressed by fashioning a batch stressor between the feedholes and the discharge slots of the die. The batch stressor causes a discontinuity in normal flow by directing batch through a venturi-like section adjacent the end of each feedhole. The effect of the batch stressor is to suddenly increase linear flow velocity due to the reduced cross-sectional area, and then just as suddenly to restore the original conditions of flow. The rapid change in particle alignment due to the cross-sectional change produces a shearing influence on the batch and essentially uniformizes or makes the batch more homogeneous as it enters the transition area or discharge slot sections of the die, significantly reducing the frequency of shadows and other web defects cause by non-uniform batch flow.

When a relatively thin component having smaller diameter holes than the diameter of the feedholes is placed across the feedhole flow, it results in added impedance due primarily to the hole diameter rather than the hole length or surface finish. Since it is easier to control hole diameter than it is surface finish during the machining operations, a means becomes available to add uniform impedance that thus shears the batch to a uniform condition before it exits such component. However, if a batch stressor component were positioned adjacent the inlet end of a feedhole, the uniformity would gradually deteriorate as flow continues down the feedhole. That is, the batch gradually spreads out into intimate contact with the sidewalls of the die feedhole where the batch again comes under the influence of surface finish irregularities along the sidewalls. Thus, it can be seen that batch flow non-uniformity at the pin face of the die can be related to the differing characteristics of the feedholes. The present invention recognizes this problem and provides a solution thereto by installing a batch stressor, which performs similarly to an impedance plate, in the batch flow channel immediately at the outlet end of the feedholes and behind the face plate, to thereby deliver uniform batch into the relatively short transition section when utilized, or directly into the discharge slots adjacent the pin face of the die. Such configuration avoids contact with the relatively long path of flow of the feedhole, and its non-uniform impact on the flow stream.

DESCRIPTION OF THE DRAWINGS

The drawings are not intended to indicate a scale or relative proportions of the elements shown therein. Like reference characters designate like or corresponding parts in the various figures.

DETAILED DESCRIPTION

Figure 1:
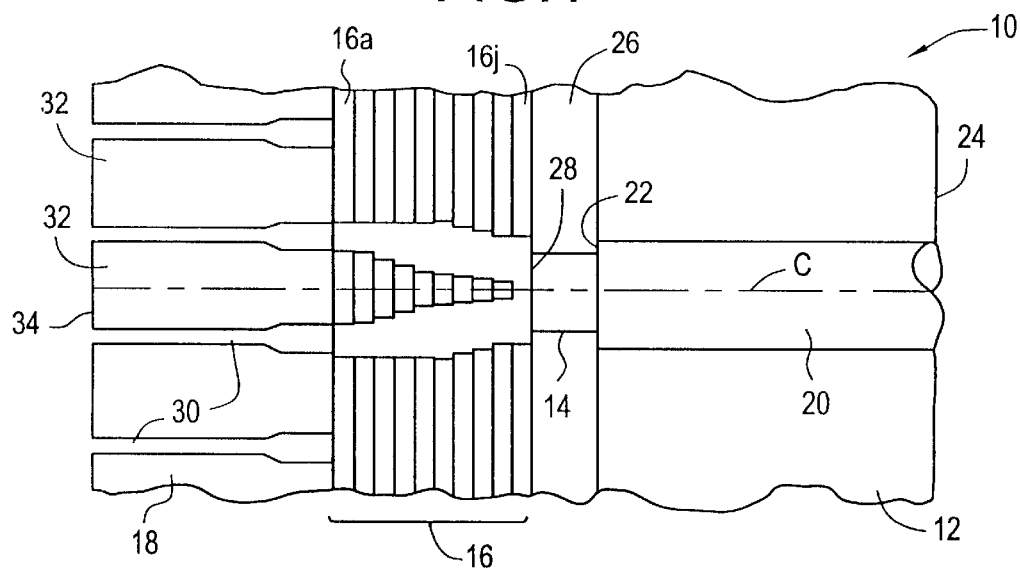
FIG. 1 is an enlarged fragmental schematic view of an extrusion die of the present invention illustrating a stressor component fabricated as a solid drilled plate positioned between the transition zone and the outlet end of the feedhole.

Referring now to FIG. 1, an extrusion die 10 is shown of a laminant construction having a body plate 12, a stressor element or component 14, a transition zone 16 formed of multiple laminant plates, and a discharge or face plate 18. The body plate 12 has a plurality of feedholes 20 formed therein which have an exit end 22 and an inlet end communicating with an inlet face 24.

The stressor component or entity 14 is positioned adjacent the exit end 22 of the feedholes 20. As shown in FIG. 1, the stressor component is fabricated in a solid drilled plate 26 of appropriate thickness which may be as thin as ⅛ to 1/16 inch. The stressor plate 26 is drilled so that the diameter of the stressor component 14 is between about 0.01" and 0.02" smaller in diameter than the feedholes 20 of the die body plate 12. As can be seen by the centerline c of FIG. 1, the hole portion of the stressor component 14 and the feedhole 20 are coaxial and thus on an identical centerline.

The transition zone 16 is formed of a plurality of thin transition plates 16a–16i such as shown in U.S. Pat. No. 5,702,659. The exit end 28 of the stressor component 14 communicates with a larger diameter entrance of the transition zone 16. Thus, it can be seen that when batch material flowing through feedhole 20 exits its end 22 and flows into the reduced diameter of the stressor component 14, a sudden increase in linear flow velocity occurs due to the reduced cross-sectional area of the stressor component. Then, as the material exits the exit end 28 of the stressor component, the flow of batch material enters a larger area and just as suddenly restores the flow to its original conditions. The batch material then flows through the transition zone and into the discharge slots 30 surrounding pins 32 and outwardly through outlet face 34. Although stressor plate 26 is shown as a solid drilled plate of appropriate thickness, if desired, such stressor component could be formed of a plurality of build-up laminant plates.

Figure 2:
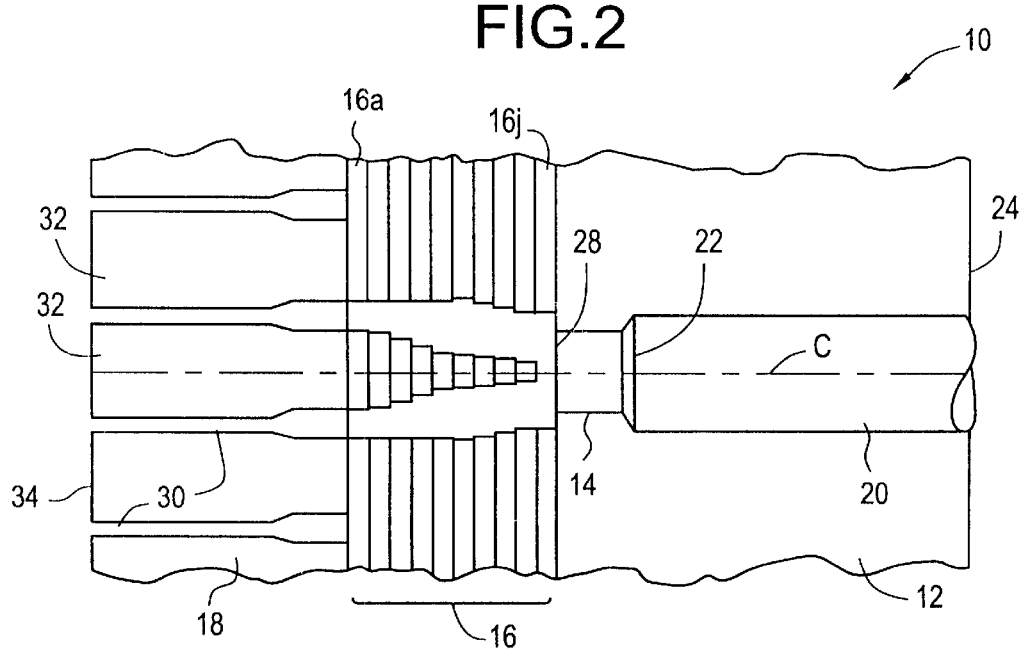
FIG. 2 is similar to FIG. 1, but with the stressor unit being built integrally with the body plate containing the feedhole.

Referring now to FIG. 2, an extrusion die 10 is shown similar to that shown in FIG. 1, but with the stressor component 14 being formed integrally with the body plate 12. The body plate 12 may be completely drilled from the inlet face 24 in a two-step operation, utilizing first the smaller drill to form the stressor component 14, and then the larger drill to form the feedhole 20. However, a more convenient operation is to drill the smaller hole comprising the stressor component 14 from the exit end of the body plate 12, and drill the larger feedhole 20 from the inlet face 24. Both holes are drilled on a common centerline c. Here again, however, the stressor component 14 functions in the same manner as that shown in FIG. 1 wherein the flow of batch material through the feedhole 20 is directed through a venturi-like stressor section which causes a sudden increase in linear flow velocity due to the reduced cross-sectional area of the stressor component, and then just as suddenly the flow is restored to its original conditions as it passes through the exit end 28 of the stressor component and into the larger flow channel of the plate 16i of the transition zone 16.

Figure 3:
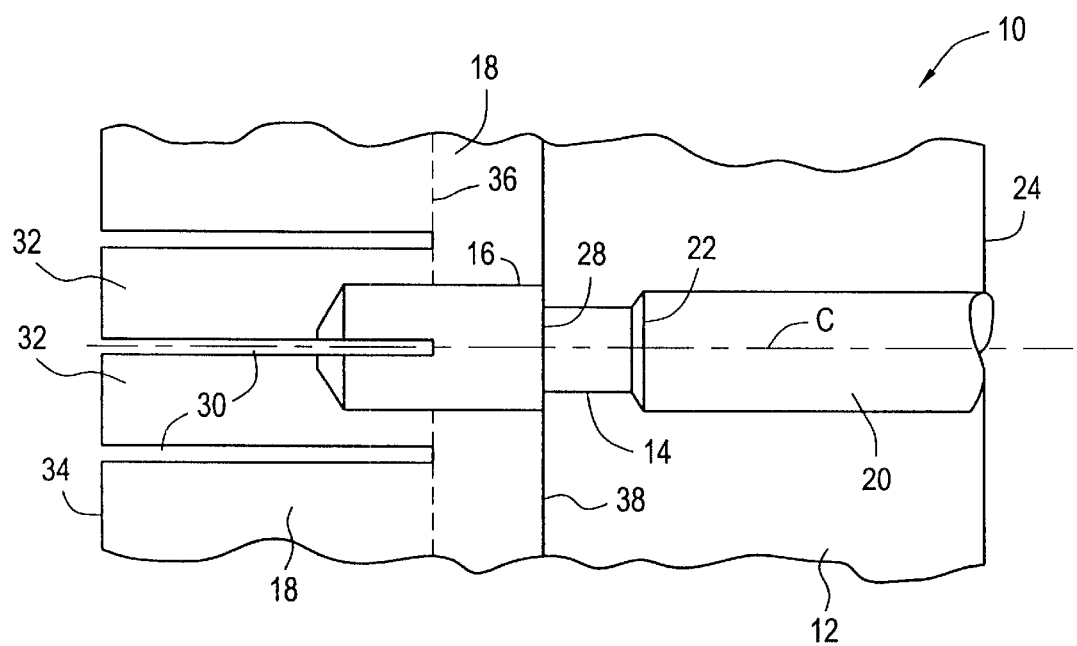
FIG. 3 illustrates a stressor unit being incorporated within a traditional billet die.

As shown in FIG. 3, the stressor component 14 may be incorporated into a traditional billet die. One convenient approach is to make the die as a two-piece assembly and then bond the components together. In a typical billet die, the exit end of the feedhole overlaps the entrance end of the discharge slots to promote the necessary lateral movement of the batch material flowing longitudinally through the discharge slots, such as disclosed in U.S. Pat. No. 3,790,654. Thus, when adapting the stressor component 14 to a billet die, it is necessary to preserve the critical overlap function of the feedholes with the discharge slots of the billet design, since it is this overlap which controls the lateral flow of the batch into the slot matrix.

However, batch flow in the feedhole/discharge slot area is already constrained and the addition of a stressor component at this point would hamper flow distribution. Thus, as noted in FIG. 3, the stressor component 14 utilized in a billet die 10 must be moved slightly upstream of the intersection 36 of the conventional feedholes and discharge slots 30. Accordingly, in this embodiment, the transition zone 16 functions as an extension of the feedholes 20 and not only permits the expansion of the batch flow exiting the stressor component 14 at exit end 28, but also facilitates the lateral flow of the batch material into the discharge slots 30. The feedhole 20, the stressor component 14 and the transition zone 16 are all formed coaxial about a common axis c.

As with the other embodiments, the batch material flows through feedholes 20 and at exit ends 22 flows into a stressor component 14 having a reduced flow channel, and then moves out of the exit end 28 of the stressor component into the larger diameter transition section 16. Here again, the stressor component 14 causes a discontinuity in the normal flow through feedholes 20 by directing the batch material through a venturi-like section of the stressor component. The effect is to suddenly increase linear flow velocity within the stressor component 14 over the normal flow in the feedholes 20, due to the reduced cross-sectional area of the stressor component, and then, just as suddenly, to restore the flow to its original conditions as it flows out exit end 28 of the stressor component 14 into the larger diameter of the feedhole extension or transition unit 16.

The drilling process for forming the step hole geometry of the bonded two-piece billet die illustrated in FIG. 3 involves accessing the body plate 12 from both faces before it is bonded to the faceplate. After drilling, the two die components are bonded together at bonding seam 38 using conventional bonding techniques. If desired, however, the step hole geometry of the billet die of FIG. 3 may also be formed in a solid (one-piece) billet die. The batch stressors are formed within the feedholes in the course of the feedhole drilling process, using non-traditional hole boring techniques such as ECM (electrochemical machining). This type of manufacturing operation has the advantage of allowing for a single piece die construction.

The utilization of the stressor component 14 in the various embodiments of the extrusion die shown in the figures, produces a shearing influence on the batch flowing therethrough due to the cross sectional change, thus producing a rapid change in particle alignment which essentially uniformizes or homogenizes the batch material as it enters the transition zone or slot sections of the die. This significantly reduces the frequency of shadows and other web defects caused by non-uniform batch flow.

Although we have disclosed the now preferred embodiments of the invention, it will be apparent to those skilled in the art that various changes and modifications may be made thereto without departing from the spirit and scope of the invention as defined in the appended claims.

We claim:

1. An extrusion die having an inlet face and an outlet face comprising:
    at least one batch feed hole of a given diameter communicating with said inlet face for receiving batch material, said at least one batch feed hole having an exit end intermediate said inlet and outlet faces,
    a stressor component having a stressor hole portion co-axial with said at least one batch feed hole and a diameter less than the given diameter of said at least one batch feed hole positioned adjacent said exit end of said at least one batch feed hole and having a stressor exit end also intermediate said inlet and outlet faces,
    a feedhole extension or transition section of larger diameter than said stressor hole section and co-axial with said at least one batch feed hole positioned adjacent to said stressor exit end for restoring batch material flow to an original condition; and
    discharge means communicating with said outlet face for discharging batch material from the die.

2. An extrusion die as defined in claim 1 including a plurality of feed holes communicating with said inlet face, and wherein said discharge means includes a plurality of interconnected discharge slots.

3. An extrusion die as defined in claim 2 wherein said stressor component is positioned between said discharge slots and said feed holes.

4. An extrusion die as defined in claim 2 wherein said feed holes are formed in a body plate, and said discharge shots are formed in a face plate.

5. An extrusion die as defined in claim 4 wherein said stressor component is in the form of a plurality of holes formed in an impedance plate, and said impedance plate is positioned adjacent said body plate and between said body plate and said face plate.

6. An extrusion die as defined in claim 4 wherein each said stressor component is in the form of a reduced diameter hole formed in said body plate at the exit end of, and on a common centerline with, one of said feedholes.

7. An extrusion die as defined in claim 4 wherein said die is provided with a transition zone between said feed holes and said discharge slots, and said stressor component is in the form of a plurality of holes, each on a common centerline with one of said feed holes, positioned between said feed holes and said transition zone.

8. In an extrusion die having feed holes for receiving and flowing batch material and openings for discharging such material from the die,
    means between an exit end of said feed holes and an entrance of said discharge openings for effectively shearing and mixing such batch material and for producing improved uniform batch consistency, said means including a smaller channel adjacent each said feed hole of lesser diameter than said feed hole and another channel at an exit end of said smaller channel having a diameter greater than that of said smaller channel, said channels being positioned between said feed holes and said discharge openings.

\* \* \* \* \*